US007330471B2

(12) United States Patent
Kim

(10) Patent No.: US 7,330,471 B2
(45) Date of Patent: Feb. 12, 2008

(54) MULTI DIGITAL SUBSCRIBER LINE ACCESS MULTIPLEXOR SYSTEM

(75) Inventor: Yong-Hoe Kim, Anyang (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 968 days.

(21) Appl. No.: 10/303,013

(22) Filed: Nov. 25, 2002

(65) Prior Publication Data
US 2003/0099239 A1    May 29, 2003

(30) Foreign Application Priority Data
Nov. 29, 2001  (KR) ............... 10-2001-0075014

(51) Int. Cl.
H04L 12/56    (2006.01)
(52) U.S. Cl. ............... 370/395.1; 370/420; 370/466
(58) Field of Classification Search ........... 370/395.51, 370/395.54, 395.61, 395.71, 395.72, 421
See application file for complete search history.

(56) References Cited

U.S. PATENT DOCUMENTS

| | | | |
|---|---|---|---|
| 6,345,051 B1 * | 2/2002 | Gupta et al. ............. | 370/395.2 |
| 6,347,075 B1 | 2/2002 | Barzegar et al. | |
| 6,359,881 B1 | 3/2002 | Gerszberg et al. | |
| 6,363,079 B1 | 3/2002 | Barzegar et al. | |
| 6,374,288 B1 | 4/2002 | Bhagavath et al. | |
| 6,424,657 B1 * | 7/2002 | Voit et al. ............. | 370/412 |
| 6,430,273 B1 | 8/2002 | Shaheen | |
| 6,434,221 B1 | 8/2002 | Chong | |
| 6,452,942 B1 * | 9/2002 | Lemieux ............. | 370/468 |
| 6,466,088 B1 | 10/2002 | Rezvani et al. | |
| 6,466,573 B1 | 10/2002 | Renucci | |
| 6,470,074 B2 | 10/2002 | Teixeria | |
| 6,480,494 B1 | 11/2002 | Hawley | |

(Continued)

FOREIGN PATENT DOCUMENTS

EP    977456 A2 *    2/2000

(Continued)

OTHER PUBLICATIONS

An article "High-speed Metallic IP Access System: ADSL" written by Fukuda, et al., published in Fujitsu, vol. 51, No. 6, pp. 419-425 on Nov. 10, 2000.

(Continued)

Primary Examiner—Chi Pham
Assistant Examiner—Kevin Mew
(74) Attorney, Agent, or Firm—Robert E. Bushnell, Esq.

(57) ABSTRACT

A multi digital subscriber line access multiplexor M-DSLAM system, connecting with an asynchronous transfer mode ATM network, linking with multiple data transmission service networks, and multiple subscriber receiving/transmitting units to perform subscriber line collection function and enable a wideband high-speed data receiving/transmitting operation among the numerous subscribers, The M-DSLAM system incorporates multiple ATM cell buses, an NIU, multiple xDSL service unit, a shelf interface unit SIU, and a main control unit MCU. Therefore, the M-DSLAM system can provide a wideband high-speed data service system, that supports high capacity processing ability and various services including a dialogue service with motion picture, such as a videoconference, a video medical service, VoD, and a voice service based on voIP. This M-DSLAM system advantageously enables on a substantial increase in the number of subscribers while significantly reducing the area occupied by the M-DSLAM system.

40 Claims, 9 Drawing Sheets

U.S. PATENT DOCUMENTS

| | | |
|---|---|---|
| 6,480,748 B1 | 11/2002 | Gerszberg et al. |
| 6,529,479 B1 * | 3/2003 | Suzuki .................... 370/236.1 |
| 6,546,089 B1 * | 4/2003 | Chea et al. .............. 379/93.06 |
| 6,563,816 B1 * | 5/2003 | Nodoushani et al. ....... 370/352 |
| 6,597,689 B1 * | 7/2003 | Chiu et al. .................. 370/354 |
| 6,667,971 B1 * | 12/2003 | Modarressi et al. ........ 370/352 |
| 6,834,038 B1 * | 12/2004 | Zelig et al. ................. 370/217 |
| 7,012,899 B1 * | 3/2006 | Hagler et al. ............... 370/252 |
| 7,203,187 B1 * | 4/2007 | Richardson et al. ........ 370/352 |

FOREIGN PATENT DOCUMENTS

| | | |
|---|---|---|
| JP | 2000-049825 | 2/2000 |

OTHER PUBLICATIONS

An article "Security Problems are found on Yahoo! BB" written by Kometa, published in Nikkei Communications, No. 353, pp. 76-77 on Nov. 5, 2001.

* cited by examiner

MULTI DIGITAL SUBSCRIBER LINE ACCESS MULTIPLEXOR SYSTEM

This application makes reference to, incorporates the same herein, and claims all benefits accruing under 35 U.S.C. §119 from an application for "MULTI DIGITAL SUBSCRIBER LINE ACCESS MULTIPLEXOR SYSTEM" earlier filed in the Korean Intellectual Property Office on the Nov. 29, 2001, and there duly assigned Serial No. 2001-75014 by that Office.

BACKGROUND OF THE INVENTION

1. Field of the Invention

The present invention relates generally to multi-digital subscriber line access processes and multiplexor systems (i.e., M-DSLAM systems) using asynchronous transfer mode (i.e., ATM) networks as backbone networks, and, more particularly, to processes and multi-digital subscriber line access processes and multiplexor systems able to provide various wideband high-speed data services at high capacity for numerous subscribers connected from the opposite site of the M-DSLAM system.

2. Description of Related Art

Generally, a digital subscriber line (i.e., generally known as a "DSL") provides a wideband high-speed data service in both directions for home or office through a normal telephone line made of copper, strung as a twisted pair cable.

There are various kinds of the DSL, collectively called xDSL in common, such as an asymmetric digital subscriber line (referred to as an "ADSL"), a high bit-rate digital subscriber line (referred to as a "HDSL"), a symmetric high speed digital subscriber line (referred to as a "SHDSL"), and a very high data rate digital subscriber line (referred to as a "VDSL"). Among the xDSL services, the ADSL service is widely used to provide a high-speed data service for a home user as well as for small and medium-sized companies. The configuration of a typical ADSL may be analyzed in order to understand the problems that I have discovered in conventional xDSL systems.

Usually, the typical asymmetric digital subscriber line (that is, the ADSL) system has a digital subscriber line access multiplexor (i.e., a "DSLAM"), a DSLAM manager, an ADSL transmission unit-receiver, and a signal splitter.

The DSLAM system is positioned in the configuration of the typical asymmetric digital subscriber line system to serve as an access node to an access network, such as an ATM network and a public switched telephone network (i.e., a "PSTN") by collecting individual, discrete subscriber's lines.

ADSL systems based on an ATM network, may connect subscribers to an Internet service provider and provide ADSL service, such as the Internet service, and plain old telephone service (i.e., "POTS") for those subscribers.

A DSLAM system using the ATM network as a backbone network, receives data from the ATM network through an ATM network connection port, extracts an ATM cell from the received data, performs ATM cell processing according to the information from the ATM cell, converts the ATM cell to an analog signal, and transmits the analog signal to an ADSL transmitter unit receiver through the ubiquitous twisted, copper wire pair telephone line sequentially in order to provide high-speed data ADSL transmission and reception service between the subscriber and the ISP network.

I have discovered that it is difficult to provide some of the various services recently requested by subscribers, such as video on demand (i.e., "VOD"), videoconferencing, video medical services, and voice service based on a voice over Internet protocol (i.e., VoIP"), as well as conventional Internet service and voice dialogue service, because various units and data processing ability with high-capacity data processing ability are required. Conventional DSLAM systems have a limited capacity. It is difficult therefore, to provide various services, such as VoD and VoIP, to subscribers, in addition to providing Internet services to those subscribers.

I have also found that conventional DSLAM systems are connected to subscribers by a single ISP network through the ATM network. The flexibility of conventional DSLAM systems is inferior, and it is impossible to provide multiple ISP services to subscribers from numerous ISPs. Moreover, the port density of conventional systems is low and the extendability of the system diminished. Furthermore, as the number of the subscribers in a densely inhabited district increases, the number of DSLAMs increases. Consequently, the area occupied by the DSLAM is inevitably increased.

In my opinion, there is an urgent requirement to develop a M-DSLAM system having a greater data processing ability, and to provide various acceptance units in order to make it possible to link subscribers with numerous distinct Internet service providers (i.e., "ISPs").

SUMMARY OF THE INVENTION

It is therefore, one object of the present invention to provide an improved multi-digital subscriber line access multiplexing process and multiplexor system.

It is another object to provide a multi-digital subscriber line access multiplexing process and multiplexor system with a capacity to connect a greater number of subscribers to various wideband, high-speed data services.

It is still another object to provide a multi-digital subscriber line access multiplexing process and multiplexor system that uses an asynchronous transfer mode network as a backbone network, to furnish a greater array of wideband, high-speed data services.

It is yet another object to provide a multi-digital subscriber line access multiplexing process and multiplexor system that uses an asynchronous transfer mode network as a backbone network, to provide digital subscriber line connections to a greater number of subscribers.

It is still yet another object to provide a multi-digital subscriber line access multiplexing process and multiplexor system that uses an asynchronous transfer mode network as a backbone network, while furnishing a wider array of wideband, high-speed data services to a greater number of subscribers.

It is also an object to provide a multi-digital subscriber line access multiplexing process and multiplexor system that is operationally compatible with an asynchronous transfer mode network, has a flexible configuration, is extendable to support various units and high capacity data processes.

It is a further object to provide a multi-digital subscriber line access multiplexing process and multiplexor system that has a greater port density and furnishes a wider array of wideband, high-speed data services.

The purpose of the present invention is to provide multi DSLAM processes and multipliers comprising various service acceptance units and multiple data buses providing a greater capacity for data processing, with a configuration for the M-DSLAM that is flexible and extendable to support the various units and high capacity data processes.

To overcome these and other problems, embodiments of the present invention provide multi digital subscriber line access processes and multiplexor (i.e., a "M-DSLAM")

systems, connecting with an asynchronous transfer mode ATM network, linking with multiple data transmission service networks, and providing multiple subscriber receiving/transmitting units to perform subscriber line collection functions to enable a wideband high-speed data receiving/transmitting operation among the numerous subscribers. A DSLAM system may be constructed with multiple ATM cell buses, wherein each multiple ATM cell bus performs a high capacity ATM cell transmission respectively. A network interface unit NIU provides multiple ATM network connection ports, receives data transmitted from the ATM network through each ATM network connection port, serves as an ATM cell interface, and transmits the data to the multiple ATM cell bus, sequentially, or vice versa. A multiple xDSL service unit provides multiple subscriber connection ports, receives an ATM cell from the ATM network transmitted to the multiple ATM cell bus by the NIU, and serves as a subscriber interface to transmit the ATM cell to the subscriber receiving/transmitting unit through each subscriber connection port, sequentially, or vice versa. A shelf interface unit SIU, has an extension shelf connection port connected with a subscriber extension shelf, receives the ATM cell of the ATM network transmitted to the multiple ATM cell bus by the NIU, and serves as an extension shelf transmission interface to transmit the ATM cell to the subscriber extension shelf connected with the extension shelf connection port, sequentially, or vice versa. A main control unit MCU controls mutual operations and data flow among the units, such as the NIU, multiple xDSL service unit, SIU, and the multiple ATM cell bus.

In a particular implementation, each of the multiple ATM cell buses supports high capacity of 1.2 Giga-bytes per second, and two 32-bit ATM cell buses, respectively.

Data transmission between the NIU and the multiple xDSL service unit uses one of two ATM cell buses, and data transmission between the NIU and the SIU uses both of the two ATM cell buses.

The multiple data transmission service networks include at least one of multiple Internet service provider ISP networks, a public switched telephone network PSTN, or a voice over Internet protocol voIP service network.

The ATM network is connected with the NIU by a way of at least one of E1/T1, digital signal 3 DS3, or synchronous transfer mode 1/4 STM-1/4.

The NIU may be an optical transceiver providing multiple ATM network connection ports, and may serve as an optical/electric interface that receives and transmits data through each of the multiple ATM network connection ports. A universal network interface module UNI receives the data in the form of an electric signal from the optical transceiver, extracts an ATM cell, and converts the ATM cell to meet the transmission standard requirement of the ATM network. A cell processor demultiplexes the ATM cell by analyzing information carried by the ATM cell extracted by the UNI, and multiplexes the ATM cell transmitted to the UNI. Multiple cell routers transmit the ATM cell demultiplexed by the cell processor to the multiple ATM cell bus, and transmit the ATM cell transmitted from the multiple ATM cell bus to the cell processor.

The SIU is connected with the subscriber extension shelf, via at least one of an E1/T1, DS3, STM-1, or STM-4 interface, in a shelf-to-shelf method.

The multiple xDSL service unit may have at least one of an asymmetric digital subscriber line (ADSL) terminal unit ATU providing an ADSL service; a symmetric high speed digital subscriber line (SHDSL) terminal unit STU providing a SHDSL service; or a very high data rate digital subscriber line (VDSL) terminal unit VTU providing a VDSL service.

The ATU may be constructed with a cell router receiving and transmitting the ATM cell from the ATM cell bus, and a multiple ADSL modem chip set connected with the cell router in a level 2 interface of a universal test and operation PHY interface for ATM UTOPIA, modulating the ATM cell transmitted from the cell router to an analog signal to output the ATM cell through the multiple subscriber connection port, and demodulating an analog signal from the subscriber connection port to a digital signal to extract an ATM cell transmitted to the cell router.

The number of multiple ATM connection ports of the NIU may be four, and the number of the multiple subscriber connection ports of each of the xDSL service units may be either sixteen or thirty-two.

The DSLAM system may also be constructed with a local area network (LAN) interface unit LIU connected directly with an Internet protocol IP network by 10/100 base-T, and a LAN terminal unit LTU connected with the subscriber by 10/100 base-T, with the LIU and the LTU generating an ATM cell for a data packet transmitted from the IP network or the subscriber to transmit the ATM cell to the multiple ATM cell bus, and converting an ATM cell, transmitted from the multiple ATM cell bus, to a packet data transmitted to the subscriber or the IP network.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
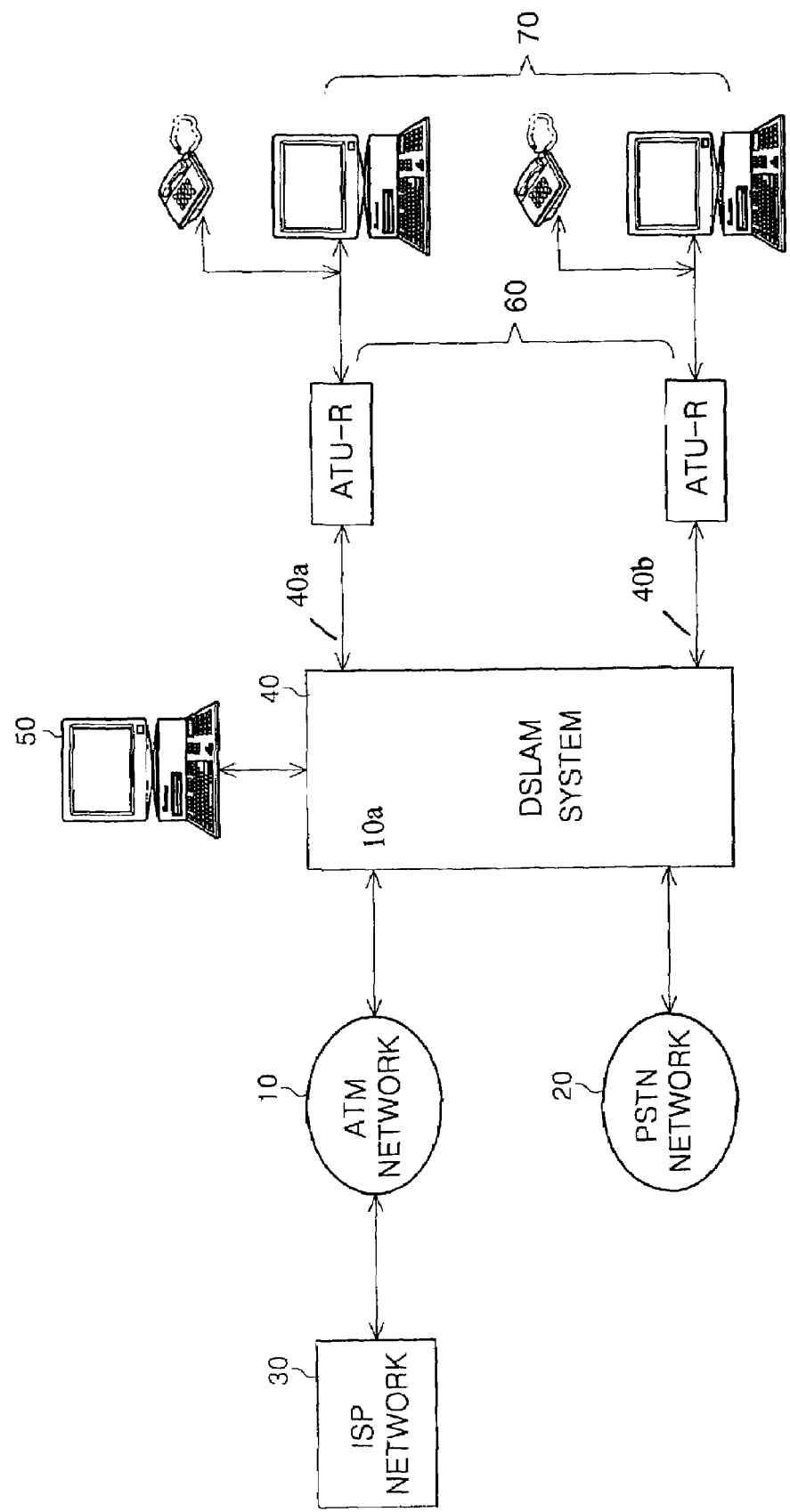
FIG. 1 is a schematic block diagram of a network configuration illustrating a conventional asymmetric digital subscriber line ADSL system.

Turning now to the drawings, FIG. 1 is a schematic diagram of a network configuration illustrating the salient features for a conventional asymmetric digital subscriber line ADSL system. As shown in FIG. 1, an ADSL system may be constructed with a DSLAM 40, a DSLAM manager 50, an ADSL transmission unit receiver ATU-R 60, and a splitter (which is not shown). The configuration of this ADSL system is representative of conventional xDSL systems.

DSLAM system 40 is positioned as an access node for an access network, such as an ATM network 10 and a public switched telephone network PSTN 20, and performs the function of collecting subscriber lines 40a, 40b. ATU-R's 60, an ADSL subscriber receiving/transmitting units, are positioned in the ends of the subscriber lines, to perform data receiving/transmitting functions between DSLAM system 40 and a subscriber 70. Additionally, a splitter (not shown) is positioned between DSLAM 40 and ATU-R 60, in order to filter and integrate the high frequency signal components for a data area and the low frequency signal components for a voice area. Recently, these functions of the splitter have been incorporated into ATU-R 60. Therefore, the splitter is not separately shown by FIG. 1.

An ADSL system constructed as illustrated by FIG. 1 with DSLAM 40, DSLAM manager 50, ADSL transmission unit-receiver ATU-R 60, and a splitter, based on the ATM network 10, may be used to connect an Internet service provider ISP network 30 with subscriber 70 to provide an ADSL type service, such as an Internet service, and a plain old telephone service (i.e., "POTS") for subscriber 70.

A DSLAM system 40 that uses an ATM network 10 as a backbone network, receives data from ATM network 10 through an ATM network connection port 10a, extracts an ATM cell from the data received, performs ATM cell processing according to the information carried by the ATM cell, modulates the ATM cell into an analog signal, and transmits the analog signal to ATU-R 60 through the twisted copper wire pair sequentially to subscriber 70, and vice versa upon transmission of an analog signal by subscriber 70.

Figure 2:
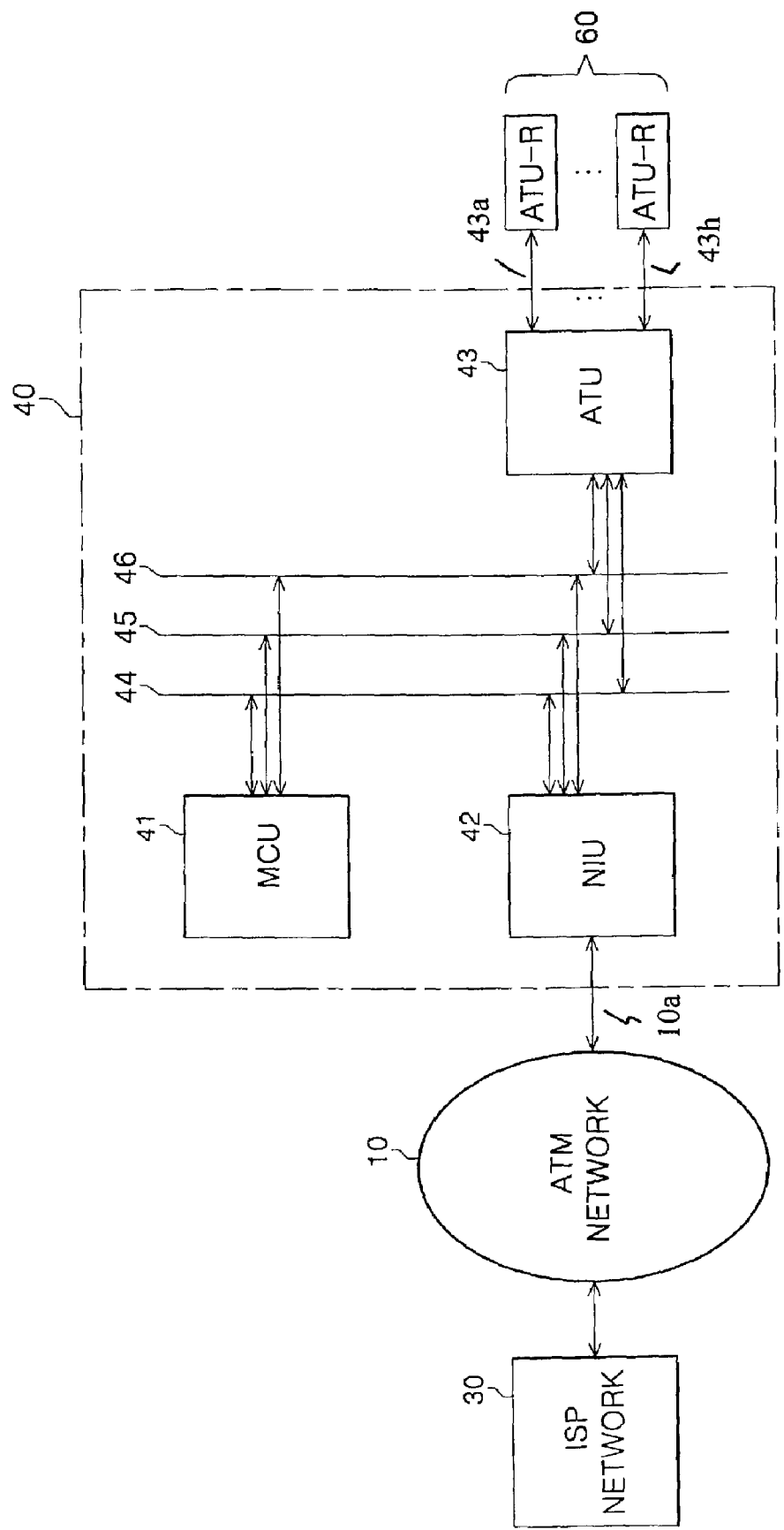
FIG. 2 is a schematic block diagram of a conventional multi-digital subscriber line access multiplexor system (a "DSLAM")

Referring now to FIG. 2, the configuration for a conventional DSLAM system 40 may have an ATM network connection port 10a, a network interface unit NIU 42, an ADSL terminal unit ATU 43, and a main control unit MCU 41.

ATM network connection port 10a is connected to ATM network 10 as an interface of a synchronous transfer module level-1 (i.e., a "STM-1") NIU 42 performs ATM cell extraction, traffic control management, ATM cell header conversion, and traffic routing. ATU 43 receives ATM cells from the NIU 42, modulates the ATM cells into analog signals, and transmits the analog signals to ATU-R 60 through eight subscriber connection ports 43a . . . 43h. MCU 41 is linked with DSLAM system 40 in order to control mutual interactions and data flow between NIU 42 and ATU 43.

Usually, MCU 41, NIU 42 and ATU 43 are fabricated as circuit boards that are installed in a back plane shelf, to exchange various data through commonly shared buses 44, 45, and 46 in the back plane shelf. Common buses 44, 45, 46 typically are respectively, a simple 16 bit ATM cell bus 44 that transmits ATM cells among units 41, 42, and 43, an operation, maintenance and management OAM data bus 45 that exchanges various data that is used to perform operations, maintenance and management functions for MCU 41, and a local bus 46 that transmits local data.

When NIU 42 receives STM-1 data transmitted from ISP network 30 through ATM network 10, NIU 42 extracts an ATM cell from the STM-1 data received, demultiplexes the ATM cell, and sequentially transmits the ATM cell via ATM cell bus 44. ATU 43 receives the ATM cell from ATM cell bus 44, modulates the ATM cell to generate an analog signal, and transmits the analog signal generated to subscriber 70 via one of subscriber connection ports 43a . . . 43h. Data transmitted from ATU 43 to subscriber 70 through ATU-R 60, is processed in reverse order by MCU 41, NIU 42 and ATU 43. In this manner, a typically DSLAM 40 performs a high-speed data receiving/transmitting function with data conducted between subscriber 70 and ISP network 30, and thereby provides ADSL service for subscriber 70.

I have discovered that this type of conventional DSLAM system 40 has some problems in receiving requests according to the changes in direction and the forecast of wideband high-speed data service.

First, I have found that it is difficult to accommodate the rapidly increasing demand for the various wideband high-speed data services required by subscribers these days. Specifically, in addition to conventional Internet service, a dialogue service, such as video on demand (i.e., "VOD"), videoconferencing, video medical services, and a voice service based on a voice-over-Internet protocol (i.e., "VoIP") have recently been requested. To supply such services, various units providing these services, with data processing ability in high capacity, are required. Conventional DSLAM system 40 however, has a limited capacity of a single ATM cell bus 44 and is also limited in acceptance units. These limitations therefore make it difficult to provide various services, such as VoD and VoIP the subscribers 70, in addition to providing Internet services to subscriber 70.

Second, I have noticed that conventional DSLAM systems 40 are connected to subscriber 70 by a single ISP network 30 and STM-1 data carried through ATM network 70. Consequently, the flexibility of the conventional DSLAM system 40 is inferior and is unable to provide multi-ISP services for numerous ISPs. Therefore, the port density of conventional systems 40 is lower, and the extendability of the shelf is diminished. Moreover, as the number of the subscribers in a densely inhabited district increases, the number of DSLAM's 40 is increased. Therefore, the area occupied by DSLAM 40 within each district will inevitably increase.

Therefore, I have noticed an urgent requirement to develop multiple-digital subscriber line access multiplexor (i.e., "M-DSLAM") systems having a high capacity of data processing ability, and providing various acceptance units that enable the M-DSLAM system to link with numerous ISPs.

Reference will now be made in detail to those embodiments able to be used in the practice of the principles of the present invention, exemplars of which are illustrated in the accompanying drawings. To describe the drawings in conformance with the principles of the present invention, a specified technical terminology is used. The present invention is not restricted however by the selected specified technical terminology. Each of the specified technical terms includes all technical synonyms for processes and circuits that operate in a similar way to achieve similar results.

Figure 3:
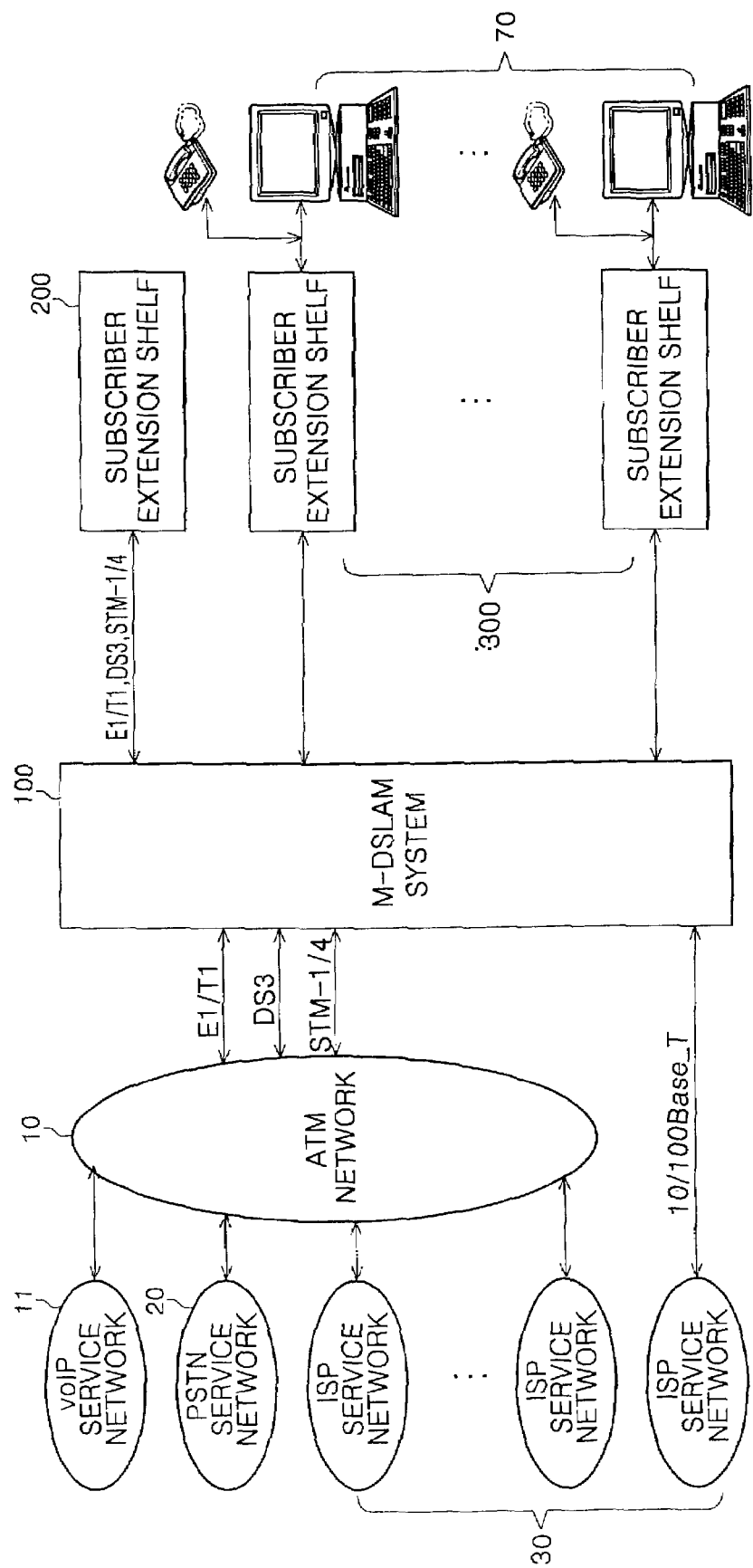
FIG. 3 is a schematic block diagram of a network configuration applying a multi-DSLAM (a "M-DSLAM") in accordance with the principles of the present invention.

FIG. 3 is a schematic diagram of a network configuration that incorporates a M-DSLAM constructed according to the principles of the present invention.

As shown in FIG. 3, M-DSLAM system 100 of the present invention uses a ATM network 10 connected with numerous ISP networks 30, PSTN 20, and a VoIP service network 20, as a backbone network to perform high-speed data reception and transmission functions, and is connected with ATM network 10 via an E1/T1, a digital signal 3 DS3, or a STM-1/4 interface.

When receiving E1/T1, DS3, or STM-1/4 data from ATM network 10, M-DSLAM system 100 extracts an ATM cell to perform cell processing, and then transmits the ATM cell to a corresponding subscriber receiving/transmitting unit 300. When subscriber receiving/transmitting unit 300 at the subscriber 70 transmits data, M-DSLAM system 100 multiplexes the data, and then transmits the multiplied data to ATM network 10. Therefore, each subscriber 70 is able to receive various xDSL-based service, such as VoD, Internet, videoconferences, video medical services, and POTS service.

M-DSLAM system 100 may be connected with a subscriber extension shelf 200 by a way of an E1/T1, DS3, or STM-1/4 interface, and connects subscriber extension shelf 200 with ATM network 10; this extends the process capability and subscriber connection ports, and substantially increases the number of subscribers 70.

M-DSLAM system 100 may be directly connected with the ISP service network through a local area network LAN by way of a 10/100 base-T interface to receive and transmit packet data. Therefore, this embodiment may enable the subscriber to receive packet data service, too.

Figure 4:
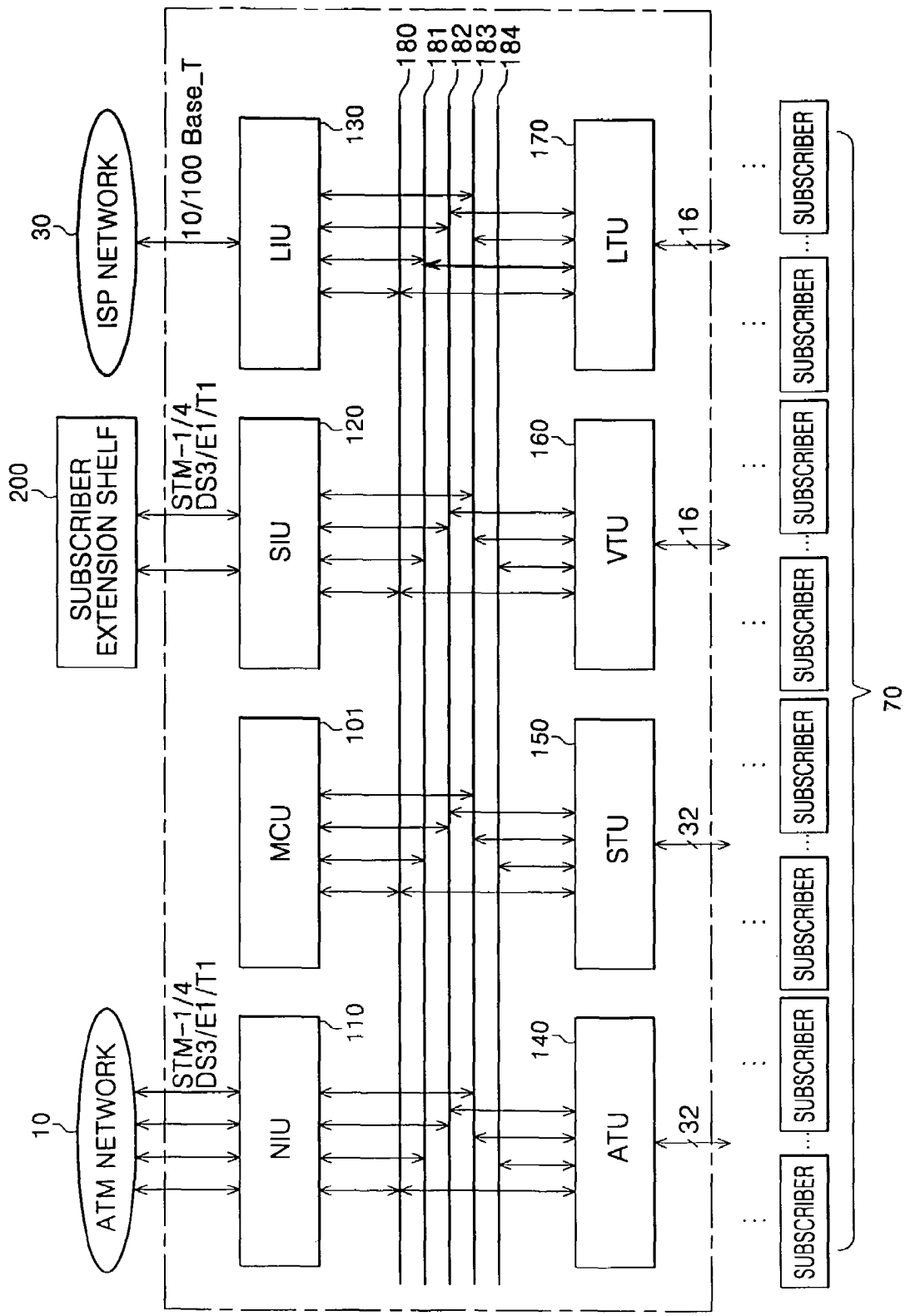
FIG. 4 is a schematic block diagram illustrating a M-DSLAM constructed according to the principles of the present invention.

FIG. 4 is a block diagram of a M-DSLAM constructed according to the principles of the present invention.

M-DSLAM system 100 may be constructed with a network interface unit NIU 110 connected with ATM network 10, a subtending interface unit SIU 120 for operationally coupling as an extension shelf interface unit, with a subscriber extension shelf, a LAN interface unit LIU 130 connecting with a local area network LAN, and a main control unit MCU 101. MCU 101 controls mutual operations between these units, as well as operation, maintenance and management (i.e., "OAM"), and data flow among multiple xDSL service units, such as an ADSL terminal unit (i.e., "ATU") 140, SHDSL terminal unit (i.e., "STU") 150, VDSL terminal unit (i.e., "VTU") 160, and LAN terminal unit (i.e., "LTU") 170, as well as mutual operation wholly between units 110-170.

Figure 5:
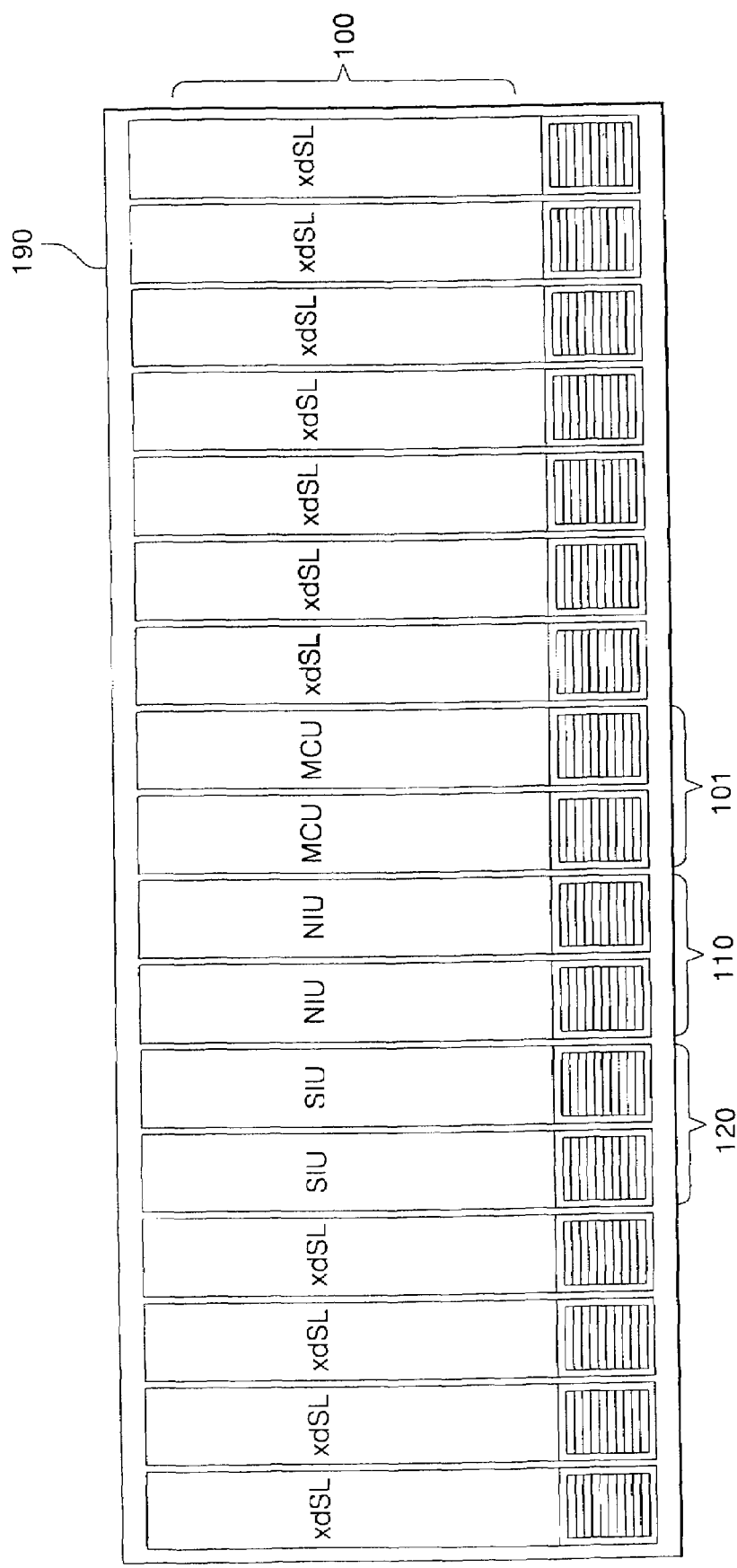
FIG. 5 is a plan view of a hardware configuration for a M-DSLAM suitable for the practice of the principles of the present invention.

FIG. 5 is a plan view of a hardware configuration of M-DSLAM 100 for an exemplary implementation of the present invention. For performing protection-switching functions, back plane shelf 190 may be equipped with seventeen printed circuit board PCB connection slots. Two of each of MCU 101, NIU 110 and SIU 120 are plugged-in to back plane shelf 190. For flexibility in this configuration, the other units, as the xDSL service units 130 to 170, are packed into back plane shelf 190 reversibly according to the kinds of services requested by the subscribers. Therefore, the number of the xDSL service units 130 . . . 170 packed into the back plane shelf 190 may be varied.

Units 101 . . . 170 exchange mutual data through a common buses from 180, 181, 182, 183 installed in back plane shelf 190. Common buses 180, 181, 182, 183, 184 may be constructed as a 32-bit first ATM cell bus 180 and second ATM cell bus 181 receiving and transmitting ATM cell routing among each of the units 101 . . . 170, OAM bus 182 receiving and transmitting OAM data between MCU 101 and the other units 110 . . . 170, local bus 183 receiving and transmitting local data mutually, and time division multiplex (i.e., "TDM") data bus 184 exchanging TDM data signal for POTS service.

Each of first ATM cell bus 180 and second ATM cell bus 181 is a high capacity bus rated at 1.2 Gbps. First ATM cell bus 180 is mainly used for exchanging data between NIU 110 and xDSL service units 140 . . . 170. Second ATM cell bus 181 is used for exchanging data between NIU 110 and SIU 120, for connecting subscriber extension shelf 200 with M-DSLAM system 100, and for conducting data between LIU 130 and LTU 170 to provide LAN based service in addition to that provided by first ATM cell bus 180.

These two high capacity ATM cell buses 180 and 181 allow high capacity data processing by M-DSLAM system 100, and enable M-DSLAM system 100 to serve as a base of various services. Therefore, it is possible to increase the number of the subscribers 70 through an extension connection to subscriber extension shelf 200.

In the following statements, The configuration of these units and the mutual operational procedures practiced among these units will be illustrated in detail according to the drawings from FIG. 6 to FIG. 9, collectively.

Figure 6:
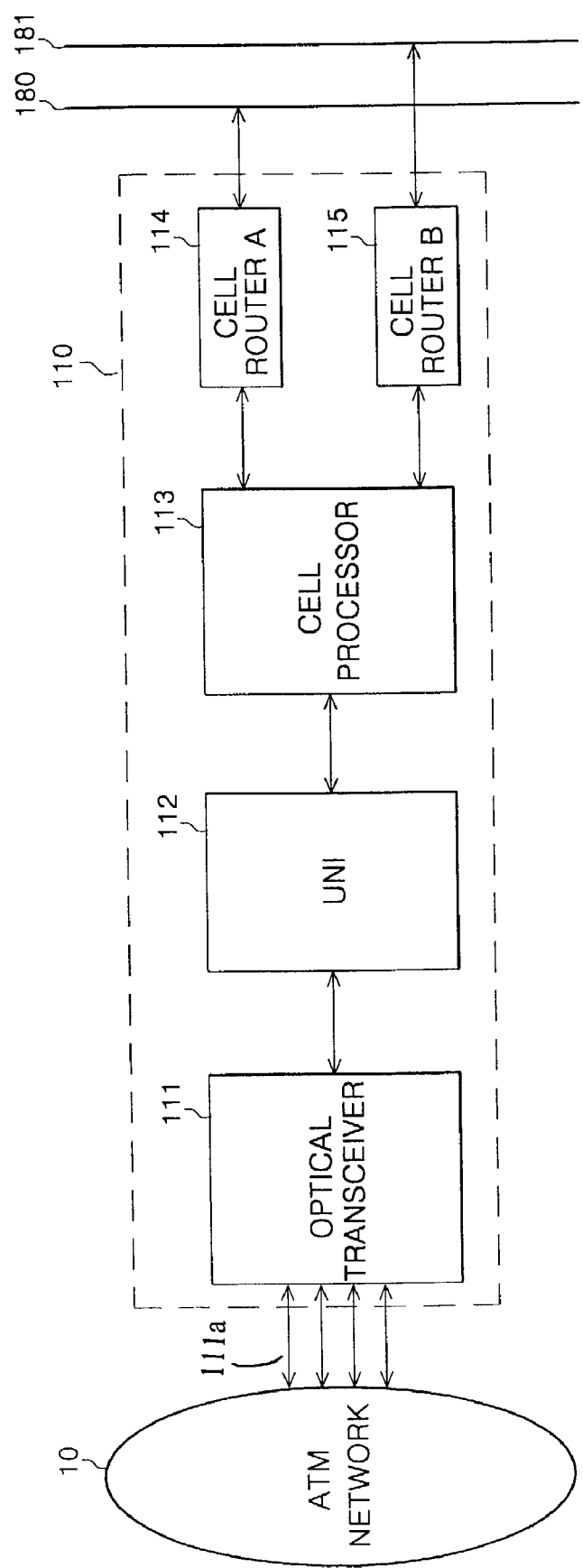
FIG. 6 is a schematic block diagram of a network interface unit NIU suitable for the practice of the principles of the present invention.

As shown in FIG. 6, NIU 110 performs interface functions that allow M-DSLAM 100 to receive E1/T1, DS3, and STM-1/4 data to and from ATM network 10.

Optical transceiver 111 may have four ATM network connection ports connecting with four distinct ISP networks 30 through ATM network 10 simultaneously, with each of the ports receiving data from the corresponding ISP network 30. When NIU 110 receives the E1/T1, DS3, or STM-1/4 data through an optical cable 111*a* from ATM network 10, optical transceiver 111 receives the data through the ATM network connection port, and serves as an optical/electric interface to convert the data carried by the optical signal into data carried by an electric signal.

Universal network interface module (i.e., "UNI") 112 receives the data carried by the electric signal from optical transceiver 111, extracts an ATM cell, serves as an ATM interface, and transmits the ATM cell to cell processor 113.

After performing the cell processing operation by demultiplexing the ATM cell received from cell processor 113 and considering the traffic situations of ATM cell buses 180, 181, cell processor 113 transmits selectively the ATM cell to one of a plurality of cell routers, in other words, a cell router A 114 and a cell router B 115. Each of cell routers 114, 115 is connected with a corresponding different one of ATM cell buses 180, 181, respectively. Sequentially, according to the routing information provided by the ATM cell, the selected one of cell routers 114, 115 transmits the ATM cell to the corresponding one of the first ATM cell bus 180 and the second ATM cell bus 181.

This selective transmission may implement a transmission protocol to use the first ATM cell bus 180 during periods of less traffic in the ATM cell stream, and use both ATM cell buses 180, 181 during periods of increased traffic in the ATM cell stream. As indicated in these statements, the ATM cell buses 180, 181 are high capacity buses rated at 1.2 Gbps, and high capacity processes are possible by using only first ATM cell bus 180. Therefore, generally, only the first ATM cell bus 180 is used during the ATM cell transmission for normal xDSL service. When an ATM cell is transmitted after a port extension through subscriber extension shelf 200, all of the ATM cell bus 180, 181 may be simultaneously used together.

When an ATM cell is transmitted from ATM network 10 to ATM cell buses 180, 181, the ATM cell is transmitted to the corresponding xDSL service unit 140 . . . 170 when the ATM cell is for xDSL service. Additionally, the ATM cell is transmitted to SIU 120 when the ATM cell is transmitted to subscriber extension shelf 200.

When an ATM cell is transmitted from either subscriber 70 or subscriber extension shelf 200 to ATM network 10, that ATM cell is transmitted to first ATM cell bus 180 or second ATM cell bus 181. NIU 110 performs the above described operations in reverse as an E1/T1, DS3, or STM-1/4 interface, and transmits the ATM cell to ATM network 10.

Additionally, the cell processing operation performed by cell processor 113 includes normal cell processing operation, such as an OAM cell processing for the ATM cell, error monitoring and management of the ATM cell transmission procedure, address translation of virtual path/virtual channel (i.e. "VP/VC") in the ATM cell information, and traffic management.

Figure 7:
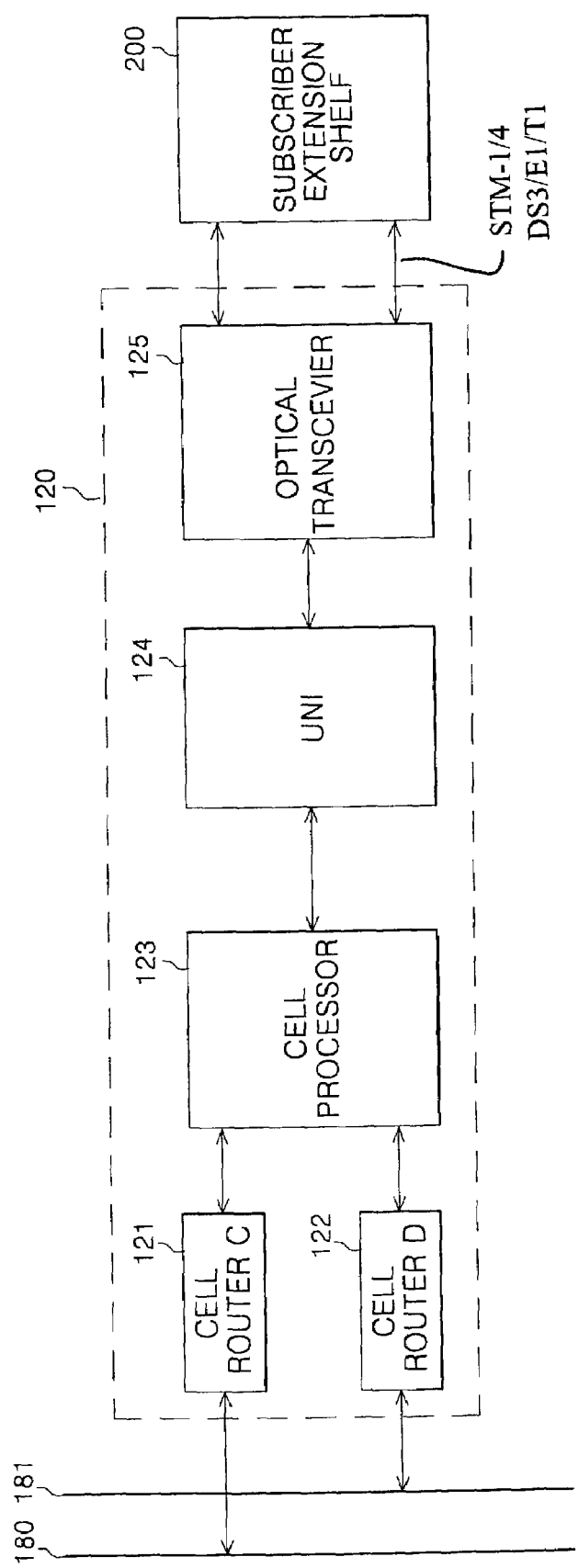
FIG. 7 is a schematic block diagram of a subtending interface unit SIU suitable for the practice of the principles of the present invention.

FIG. 7 is a schematic block diagram illustrating a subtending interface unit SIU 120 for the practice of the present invention. When SIU 120 is connected with the subscriber extension shelf 200, the connection increases the number of the subscribers 70 that may be connected with the ATM network 10 through NIU 110. Subscriber extension shelf 200, a sub-system of M-DSLAM system 100, has multiple subscriber connection ports, and receives via an E1/T1, DS3, or STM-1/4 interface, a connection with the subscriber receiving/transmitting unit 300. SIU 120 is connected with subscriber extension shelf 200 by way of E1/T1, DS3, or STM-1/4 interface through the shelf-to-shelf connection method.

When the ATM cell from NIU 110 is transmitted through ATM cell buses 180, 181, cell routers C and D 121, 122, respectively, connected with the corresponding ATM cell buses 180, 181, respectively, receives the ATM cell, and transmits the ATM cell to cell processor 123. Sequentially, the cell processor 123 performs a cell processing operation according to information of the ATM cell.

The cell process operations of cell processor 123 includes multiplexing for transmitting the ATM cell, OAM processing related to MCU 101, error monitoring and managing in the ATM cell transmission procedure, and VPI/VCI mapping. The ATM cell passes through UNI 124 and an extension shelf connection port of optical transceiver 125, and is transmitted to subscriber extension shelf 200 by way of E1/T1, DS3, or STM-1/4 interface.

In the reverse transmission, when data is transmitted from subscriber receiving/transmitting unit 300 connected with subscriber extension shelf 200, SIU 120 receives the data through optical transceiver 125, performs in reverse the foregoing procedures to transmit the data to NIU 110.

The extension of subscriber extension shelf 200 via SIU 120 substantially increases the number of subscribers 70 able to connect to ATM network 10 through NIU 110 in M-DSLAM system 100.

Additionally, the ATM cell transmitted mainly through first ATM cell bus 180 for xDSL service, is transmitted to the corresponding xDSL service unit, such as ATU 140, STU 150, VTU 160, and LTU 170, according to the kind of the service requested by the subscriber.

Figure 8:
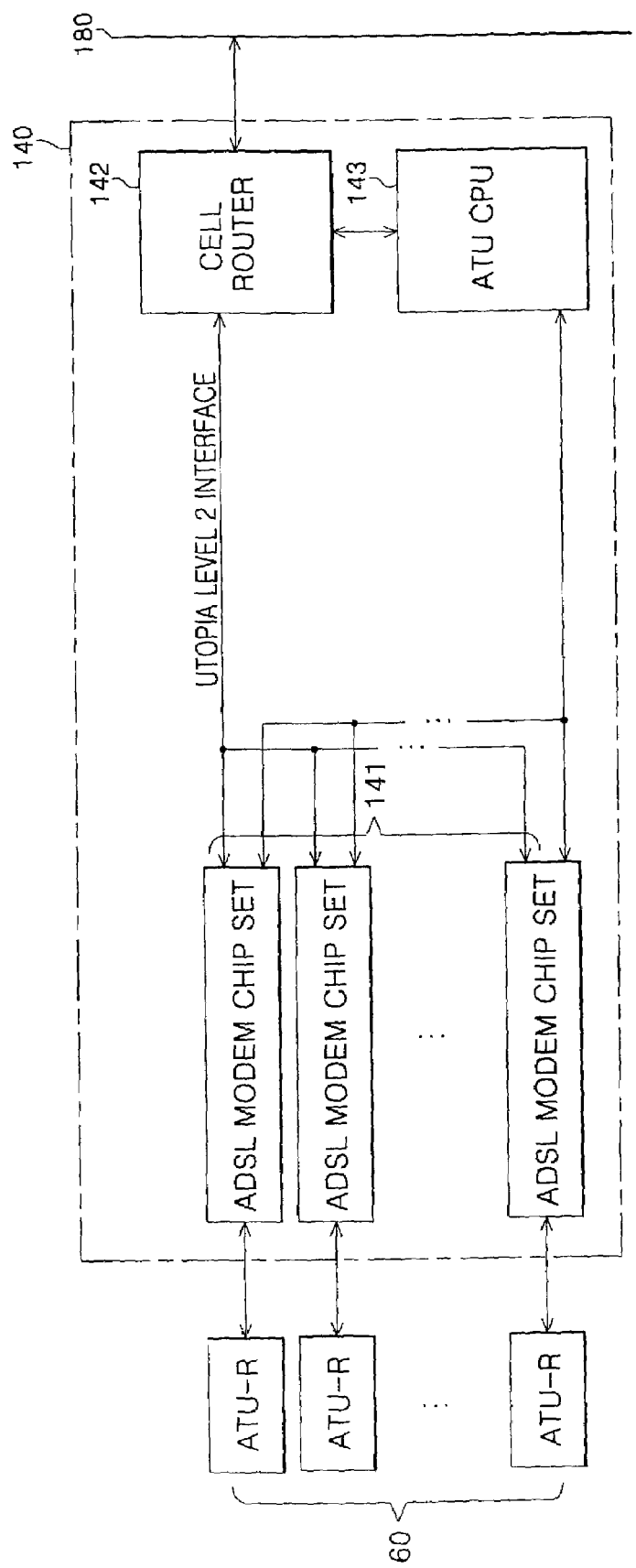
FIG. 8 is a schematic block diagram of an ADSL terminal unit ATU suitable for the practice of the principles of the present invention.

FIG. 8 is a schematic block diagram of ADSL terminal unit (i.e., "ATU") 140 for the practice of the present invention. The configuration and the operation of ATU 140 will be illustrated as an example of xDSL service units from 140 . . . 170 providing ADSL service. As shown in FIG. 8, the central processing unit of the ATU, ATU CPU 143, controls OAM processing, transmission management processing, and error management processing entirely. When the ATM cell is transmitted from NIU 10 to ATU 140 through first ATM cell bus 180, cell router 142 of ATU 140 receives the ATM cell, transmits the ATM cell to an ADSL modem chip set, or PHY modem chip set 141, via a level 2 interface of a universal test and operation physical or physical layer protocol interface for ATM (i.e., "UTOPIA"). Sequentially, ADSL modem chip set 141 modulates the ATM cell into an analog signal, and transmits the ATM cell to ADSL transmission unit-receiver ATU-R 60 at high speed by using a normal/twisted pair copper telephone line.

When an analog signal is transmitted from the subscriber 70 through ATU-R 60, ADSL modem chip set 141 receives the analog signal, converts the analog signal into a digital signal, and transmits the digital signal to cell router 142 via a level 2 interface of UTOPIA. The data that subscriber 70 transmitted to cell router 142, is transmitted to NIU 110 through first ATM cell bus 180, and subsequently, NIU 110 transmits the data to ATM network 10.

STU 150 and VTU 160 linking with NIU 110 and first ATM cell bus 180, enable the other xDSL services besides ADSL service, such as SHDSL and VDSL service. Each of ATU 140 and STU 150 may provide thirty-two subscriber connection ports, respectively, and VTU 160 may provide sixteen subscriber connection ports.

Figure 9:
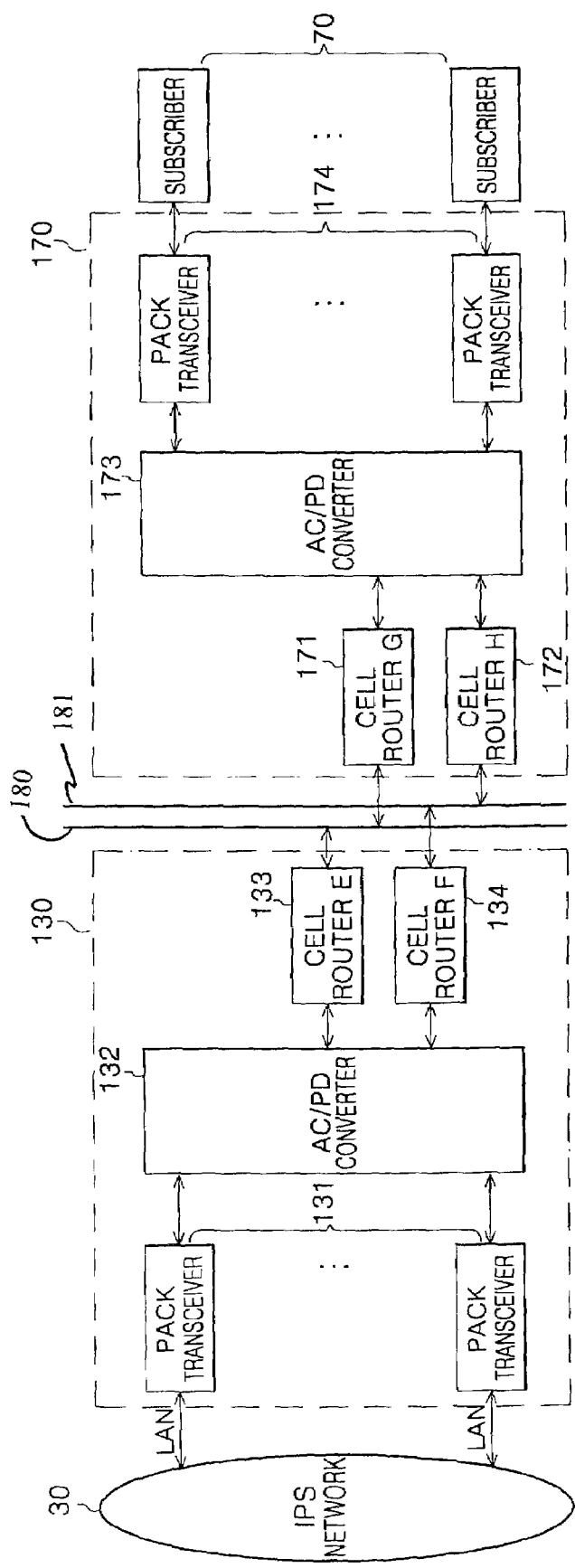
FIG. 9 is a schematic block diagram of a LAN interface unit LIU and a LAN terminal unit LTU suitable for the practice of the principles of the present invention.

FIG. 9 is a block diagram of a LAN interface unit (i.e., "LIU") 130 and a LAN terminal unit LTU 170 that may be used in the practice of the present invention. As shown in FIG. 9, LIU 130 is not connected with ATM network 10, but is connected with an Internet protocol IP network, such as ISP network 30, by the 10/100 base-T local area network, and provides a LAN based service.

When a data packet is transmitted from ISP network 30, packet transceiver 131 receives the data packet, and ATM cell/data packet AC/PD converter 132 generates an ATM cell for the data packet received by packet transceiver 131 and transmits the ATM cell to cell router E and F 133, 134.

Sequentially, the ATM cell is transmitted to LTU 170, which has a symmetric configuration with LIU 130, through first ATM cell bus 180 and second ATM cell bus 181. LTU 170 receives the ATM cell through cell routers G and H 171, 172, respectively, performs the receiving procedure in reverse in order to transmit the packet data to the subscriber 70 by the 10/100 base-T/network.

Therefore, through mutual ARM cell transmission using first ATM cell bus 180 and second ATM cell bus 181 of LIU 130 and LTU 170, LAN base service is provided between ISP network 30 and subscribers 70. When a LAN base service is requested, LIU 130 and LTU 170 are plugged-in to the xDSL connection slot of back plane shelf 190.

As described in the above statements, the M-DSLAM system 100 of the present invention supports high capacity ATM cell buses. Therefore, various DSL service units in addition to ATU, STU and VTU can be added to the numerous xDSL service units without exceeding the limits of the service capacity of M-DSLAM system 100.

The present invention provides a M-DSLAM system with network interface unit connected with the ATM network and numerous subscribers, and with multiple ATM network connection ports, as well as various xDSL service units, such as ATU, STU, LTU, and VTU, and with a SIU supporting extensions to the subscriber extension shelf. As a result, an M-DSLAM system configured according to the principles of the present invention is able to link the various units described above with multiple high capacity ATM cell buses to support various services, to perform high capacity data processing, and to accommodate superior extendability.

Therefore, the M-DSLAM system of the present invention can be used to construct a wideband high-speed data service system, that supports high capacity processing ability and various xDSL services, including a dialogue service with motion picture, such as a videoconference, a video medical service, VoD, and a voice service based on VoIP.

The M-DSLAM system of the present invention is available to connect with multiple ISP networks and to attach an extended sub-system and thereby provide very high port density. As a result, the M-DSLAM system of the present invention provides advantages such that the number of subscribers can be increased enormously and the large area previously occupied by a DSLAM system is reduced remarkably.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A multi-digital subscriber line access multiplexor system, connecting with an asynchronous transfer mode ATM network, linking with multiple data transmission service networks, and multiple subscriber receiving/transmitting units to perform subscriber line collection functions to enable a wideband high-speed data receiving/transmitting operation among the numerous subscribers, the system comprising:
   multiple ATM cell buses each accommodating ATM cell transmission;
   a network interface unit, including a plurality of ATM network connection ports, receiving data transmitted from the ATM network through corresponding ATM network connection ports, providing an ATM cell interface and transmitting the data on the multiple ATM cell buses, sequentially;
   a multiple xDSL service unit including multiple subscriber connection ports receiving ATM cells from the ATM network transmitted on the multiple ATM cell buses from the network interface unit, and providing a subscriber interface to transmit ATM cells to the subscriber receiving/transmitting units through corresponding subscriber connection ports, sequentially;
   a subscriber interface unit, including an extension shelf connection port connected with a subscriber extension shelf, receiving ATM cells from the ATM network transmitted to the multiple ATM cell buses by the network interface unit, and providing an extension shelf transmission interface to transmit the ATM cells to the subscriber extension shelf connected to the extension shelf connection port, sequentially; and
   a main control unit MCU controlling mutual operations and data flow among the network interface unit, the multiple xDSL service unit, the subscriber interface unit, and the multiple ATM cell buses.

2. The system according to claim 1, wherein each of the multiple ATM cell buses comprises two 32-bit ATM cell buses supporting transmission at 1.2 Giga-bytes per second.

3. The system according to claim 1, wherein data transmission between the network interface unit and the multiple xDSL service unit uses one of two of said ATM cell buses, and data transmission between the network interface unit and the subscriber interface unit uses two of said ATM cell buses.

4. The system according to claim 1, wherein the multiple data transmission service networks comprise at least one of a multiple Internet service provider network, a public switched telephone network, and a voice over Internet protocol service network.

5. The system according to claim 1, wherein the ATM network is connected with the network interface unit by way of at least one of E1/T1, digital signal 3 DS3, and synchronous transfer mode STM-1/4.

6. The system according to claim 1, wherein the network interface unit comprises:
   an optical transceiver comprising multiple ATM network connection ports providing an optical/electric interface receiving and transmitting data through each of the multiple ATM network connection ports;
   a universal network interface module receiving data carried by an electric signal from the optical transceiver, extracting ATM cells from the data, and converting ATM cells to meet transmission standard requirement of the ATM network;
   a cell processor demultiplexing ATM cells based on information from the ATM cells extracted by the universal network interface, and multiplexing ATM cells transmitted to the universal network interface; and
   multiple cell routers transmitting ATM cells demultiplexed by the cell processor to the multiple ATM cell buses, and transmitting ATM cells transmitted from the multiple ATM cell buses to the cell processor.

7. The system according to claim 1, wherein the subscriber interface unit is connected shelf-to-shelf to the subscriber extension shelf via at least one of E1/T1, DS3, STM-1, and STM-4 interface.

8. The system according to claim 1, wherein the multiple xDSL service unit comprises at least one of:
   an asymmetric digital subscriber line terminal unit providing asymmetric digital subscriber line service;
   a symmetric high speed digital subscriber line terminal unit providing symmetric high speed digital subscriber line service; and
   a very high data rate digital subscriber line terminal unit providing a very high data rate service.

9. The system according to claim 8, with the asymmetrical digital subscriber line transfer unit comprising:
   a cell router receiving/transmitting ATM cells from the ATM cell buses; and
   a multiple asymmetric digital subscriber line modem chip set, connected with the cell router in level 2 interface of a universal test and operation physical layer protocol interface for asynchronous transfer mode, modulating ATM cells transmitted from the cell router to analog signals to output ATM cells through multiple subscriber connection ports, and demodulating analog signals from the subscriber connection ports into digital signals and extract ATM cells transmitted to the cell router.

10. The system according to claim 1, wherein the number of the multiple ATM connection ports of the network interface unit is four, and the number of the multiple subscriber connection ports of each of the xDSL service units is at least sixteen.

11. The system according to claim 1, further comprising:
   a local area network interface unit connected directly with an Internet protocol IP network by 10/100 base-T; and
   a local area network terminal unit connected with the subscriber by 10/100 base-T, wherein the local area network interface unit and the local area network interface terminal unit generates ATM cells for packet data transmitted from the Internet provider network or the subscriber to transmit ATM cells to the multiple ATM cell buses, and converts ATM cells, transmitted from the multiple ATM cell buses, into packet data transmitted to the subscriber or the Internet provider network.

12. A multi-digital subscriber line access multiplexor system, comprising:
a plurality of multiple ATM cell buses each providing transmission of ATM cells;
a network interface unit having a plurality of ATM network connection ports, disposed to sequentially transmit data received from an ATM network through said network connection ports, via said ATM cell buses, and to sequentially transmit to the ATM network through said network connection ports, data received via said ATM cell buses;
a plurality of functionally different xDSL service units each providing a plurality of subscriber connection ports, disposed to transmit ATM cells received via said ATM cell buses and said network interface unit to subscriber receiving/transmitting units corresponding to said subscriber connection ports, and to transmit ATM cells received through said subscriber connections ports to the ATM network via said multiple ATM cell buses and said network interface unit;
a subscriber interface unit comprising an extension shelf connection port oriented to be connected with a subscriber extension shelf, transmitting sequentially to any subscriber extension shelf connected with said extension shelf connection port, ATM cells received from the ATM network via said network interface unit and said multiple ATM cell buses, and sequentially transmitting to the ATM network via said multiple ATM cell buses and said network interface unit, ATM cells received through said subscriber extension shelf connection port; and
a main control unit controlling data flow via said multiple ATM cell buses between said network interface unit, said DSL service units and said shelf interface unit.

13. The system according to claim 12, wherein each of the multiple ATM cell buses comprises two 32-bit ATM cell buses supporting transmission at 1.2 Giga-bytes per second.

14. The system according to claim 12, wherein data transmission between the network interface unit and the multiple xDSL service units uses one of two of said ATM cell buses, and data transmission between the network interface unit and the subscriber interface unit uses two of said ATM cell buses.

15. The system according to claim 12, wherein the multiple data transmission service networks comprise at least one of a multiple Internet service provider network, a public switched telephone network, and a voice over Internet protocol service network.

16. The system according to claim 12, wherein the ATM network is connected with the network interface unit via at least one of E1/T1, digital signal 3 DS3, and synchronous transfer mode STM-1/4.

17. The system according to claim 12, wherein the network interface unit comprises:
an optical transceiver comprising multiple ATM network connection ports providing an optical/electric interface receiving and transmitting data through each of the multiple ATM network connection ports;
a universal network interface module receiving data carried by an electric signal from the optical transceiver, extracting ATM cells from the data, and converting ATM cells to meet transmission standard requirements of the ATM network;
a cell processor demultiplexing ATM cells based on information from the ATM cells extracted by the universal network interface, and multiplexing ATM cells transmitted to the universal network interface; and
multiple cell routers transmitting ATM cells demultiplexed by the cell processor to the multiple ATM cell buses, and transmitting ATM cells transmitted from the multiple ATM cell buses to the cell processor.

18. The system according to claim 12, wherein the subscriber interface unit is connected shelf-to-shelf to the subscriber extension shelf via at least one of an E1/T1, DS3, STM-1, and STM-4 interface.

19. The system according to claim 12, wherein the multiple xDSL service units comprise at least one of:
an asymmetric digital subscriber line terminal unit providing asymmetric digital subscriber line service;
a symmetric high speed digital subscriber line terminal unit providing symmetric high speed digital subscriber line service; and
a very high data rate digital subscriber line terminal unit providing a very high data rate service.

20. The system according to claim 19, with the asymmetrical digital subscriber line transfer unit comprising:
a cell router receiving/transmitting ATM cells from the ATM cell buses; and
a multiple asymmetric digital subscriber line modem chip set, connected with the cell router in level 2 interface of a universal test and operation physical layer protocol interface for asynchronous transfer mode, modulating ATM cells transmitted from the cell router to analog signals to output ATM cells through multiple subscriber connection ports, and demodulating analog signals from the subscriber connection ports into digital signals and extract ATM cells transmitted to the cell router.

21. The system according to claim 12, further comprised of said network interface unit providing four multiple ATM connection ports, and each of said xDSL service units provide at least sixteen multiple subscriber connection ports.

22. The system according to claim 12, further comprising:
a local area network interface unit connected directly with an Internet protocol IP network by 10/100 base-T; and
a local area network terminal unit connected with the subscriber by 10/100 base-T, wherein the local area network interface unit and the local area network interface terminal unit generates ATM cells for packet data transmitted from the Internet provider network or the subscriber to transmit ATM cells to the multiple ATM cell buses, and converts ATM cells, transmitted from the multiple ATM cell buses, into packet data transmitted to the subscriber or the Internet provider network.

23. A multi-digital subscriber line access multiplexor system, comprising:
a plurality of multiple ATM cell buses each providing transmission of ATM cells;
a network interface unit having a plurality of ATM network connection ports, disposed to sequentially transmit data received from an ATM network through said network connection ports, via said ATM cell buses, and to sequentially transmit data received via said ATM cell buses to the ATM network through said network connection ports;
a plurality of functionally different xDSL service units each providing a plurality of subscriber connection ports, disposed to transmit ATM cells received via said ATM cell buses and said network interface unit to subscriber receiving/transmitting units corresponding to said subscriber connection ports, and to transmit ATM cells received through said subscriber connections ports to the ATM network via said multiple ATM cell buses and said network interface unit;
- a local area network terminal unit providing connections for subscribers;
- a local area network interface unit connectable with Internet protocol directly to an Internet provider network to generate ATM cells for packet data transmitted from the Internet provider network and from subscribers connected to said local area network, and to convert ATM cells transmitted via said ATM cell buses into packet data for transmission to the Internet provider network and the subscribers connected to said local area network; and
- a main control unit controlling data flow via said multiple ATM cell buses between said network interface unit, said DSL service units and said shelf interface unit.

24. The multi-digital subscriber line access multiplexor system of claim 23, further comprised of a shelf interface unit comprising an extension shelf connection port oriented to be connected with a subscriber extension shelf, transmitting sequentially to any subscriber extension shelf connected with said extension shelf connection port, ATM cells received from the ATM network via said network interface unit and said multiple ATM cell buses, and sequentially transmitting to the ATM network via said multiple ATM cell buses and said network interface unit, ATM cells received through said subscriber extension shelf connection port.

25. The multi-digital subscriber line access multiplexor system of claim 23, wherein data transmission between the network interface unit and the multiple xDSL service units uses one of two of said ATM cell buses, and data transmission between the network interface unit and the subscriber interface unit uses two of said ATM cell buses.

26. The multi-digital subscriber line access multiplexor system of claim 23, wherein said xDSL service units comprise at least one of a multiple Internet service provider network, a public switched telephone network, and a voice over Internet protocol service network.

27. The multi-digital subscriber line access multiplexor system of claim 23, wherein the ATM network is connected with the network interface unit via at least one of E1/T1, digital signal 3 DS3, and synchronous transfer mode STM-1/4.

28. The multi-digital subscriber line access multiplexor system of claim 23, wherein the network interface unit comprises:
- an optical transceiver comprising multiple ATM network connection ports providing an optical/electric interface receiving and transmitting data through each of the multiple ATM network connection ports;
- a universal network interface module receiving data carried by an electric signal from the optical transceiver, extracting ATM cells from the data, and converting ATM cells to meet transmission standard requirement of the ATM network;
- a cell processor demultiplexing ATM cells based on information from the ATM cells extracted by the universal network interface, and multiplexing ATM cells transmitted to the universal network interface; and
- multiple cell routers transmitting ATM cells demultiplexed by the cell processor to the multiple ATM cell buses, and transmitting ATM cells transmitted from the multiple ATM cell buses to the cell processor.

29. The multi-digital subscriber line access multiplexor system of claim 23, wherein the multiple xDSL service units comprises at least one of:
- an asymmetric digital subscriber line terminal unit providing asymmetric digital subscriber line service;
- a symmetric high speed digital subscriber line terminal unit providing symmetric high speed digital subscriber line service; and
- a very high data rate digital subscriber line terminal unit providing a very high data rate service.

30. A multi-digital subscriber line access multiplexor system, comprising:
- a plurality of parallel, multiple ATM cell buses each providing transmission of ATM cells;
- a network interface unit having a plurality of ATM network connection ports, disposed to sequentially transmit data received from an ATM network through said network connection ports, via said multiple ATM cell buses, and to sequentially transmit data received via said multiple ATM cell buses to the ATM network through said network connection ports;
- a plurality of functionally different xDSL service units comprised of at least one of:
    - an asymmetric digital subscriber line (ADSL) terminal unit (ATU) providing an ADSL service,
    - a symmetric high speed digital subscriber line (SHDSL) terminal unit (STU) providing a SHDSL service, and
    - a very high data rate digital subscriber line (VDSL) terminal unit VTU providing a VDSL service, with each of said xDSL service units providing a plurality of subscriber connection ports, disposed to transmit ATM cells received via said multiple ATM cell buses and said network interface unit to subscriber receiving/transmitting units corresponding to said subscriber connection ports, and to transmit ATM cells received through said subscriber connections ports to the ATM network via said multiple ATM cell buses and said network interface unit; and
- a main control unit controlling data flow via said multiple ATM cell buses between said network interface unit, said xDSL service units and said shelf interface unit.

31. The multi-digital subscriber line access multiplexor system of claim 30, further comprised of a shelf interface unit comprising an extension shelf connection port oriented to be connected with a subscriber extension shelf, transmitting sequentially to any subscriber extension shelf connected with said extension shelf connection port, ATM cells received from the ATM network via said network interface unit and said multiple ATM cell buses, and sequentially transmitting to the ATM network via said multiple ATM cell buses and said network interface unit, ATM cells received through said subscriber extension shelf connection port.

32. The multi-digital subscriber line access multiplexor system of claim 30, wherein data transmission between the network interface unit and the multiple xDSL service units uses one of two of said ATM cell buses, and data transmission between the network interface unit and the subscriber interface unit uses two of said ATM cell buses.

33. The multi-digital subscriber line access multiplexor system of claim 30, wherein the ATM network is connected with the network interface unit via at least one of E1/T1, digital signal 3 DS3, and synchronous transfer mode STM-1/4.

34. The multi-digital subscriber line access multiplexor system of claim 32, wherein the network interface unit comprises:

an optical transceiver comprising multiple ATM network connection ports providing an optical/electric interface receiving and transmitting data through each of the multiple ATM network connection ports;

a universal network interface module receiving data carried by an electric signal from the optical transceiver, extracting ATM cells from the data, and converting ATM cells to meet transmission standard requirement of the ATM network;

a cell processor demultiplexing ATM cells based on information from the ATM cells extracted by the universal network interface, and multiplexing ATM cells transmitted to the universal network interface; and multiple cell routers transmitting ATM cells demultiplexed by the cell processor to the multiple ATM cell buses, and transmitting ATM cells transmitted from the multiple ATM cell buses to the cell processor.

35. The multi-digital subscriber line access multiplexor system of claim 32, wherein the multiple xDSL service units comprises at least one of:

an asymmetric digital subscriber line terminal unit providing asymmetric digital subscriber line service;

a symmetric high speed digital subscriber line terminal unit providing symmetric high speed digital subscriber line service; and a very high data rate digital subscriber line terminal unit providing a very high data rate service.

36. The multi-digital subscriber line access multiplexor system of claim 31, wherein the subscriber interface unit is connected shelf-to-shelf to the subscriber extension shelf via at least one of E1/T1, DS3, STM-1, and STM-4 interface.

37. A multi-digital subscriber line access multiplexing process, comprising:

transmitting ATM cells via a plurality of parallel, multiple ATM cell buses;

forming a network interface unit having a plurality of ATM network connection ports;

sequentially transmitting via said multiple ATM cell buses, data received from an ATM network through said network connection ports;

sequentially transmitting to the ATM network through said network connection ports, data received from subscribers via said multiple ATM cell buses;

providing a plurality of subscriber connection ports to a plurality of functionally different xDSL service units;

transmitting to subscriber receiving/transmitting units corresponding to said subscriber connection ports, ATM cells received via said multiple ATM cell buses and said network interface unit;

transmitting ATM cells received through said subscriber connections ports to the ATM network via said multiple ATM cell buses and said network interface unit;

operationally connecting a subscriber interface unit comprising an extension shelf connection port oriented to a subscriber extension shelf;

transmitting sequentially to said subscriber extension shelf, ATM cells received from the ATM network via said network interface unit and said multiple ATM cell buses; and sequentially transmitting to the ATM network via said multiple ATM cell buses and said network interface unit, ATM cells received through said subscriber extension shelf connection port.

38. The process of claim 37, further comprised of providing two 32-bit ATM cell buses and transmitting ATM cells via said 32-bit ATM cell buses at rates up to 1.2 Giga-bytes per second.

39. The process of claim 37, further comprised of transmitting data transmission between the network interface unit and the multiple xDSL service units via one of two of said 32-bit ATM cell buses, and transmitting data between the network interface unit and the subscriber interface unit via two of said 32-bit ATM cell buses.

40. The process of claim 37, further comprised of a shelf interface unit comprised of transmitting sequentially via an extension shelf connection port to any subscriber extension shelf connected with said extension shelf connection port, ATM cells received from the ATM network via said network interface unit and said parallel ATM cell buses, and sequentially transmitting to the ATM network via said parallel ATM cell buses and said network interface unit, ATM cells received through said subscriber extension shelf connection port.

* * * * *